J. G. FRIEMAN.
VEHICLE SIGNAL.
APPLICATION FILED FEB. 25, 1919.
1,363,863.
Patented Dec. 28, 1920.
4 SHEETS—SHEET 3.
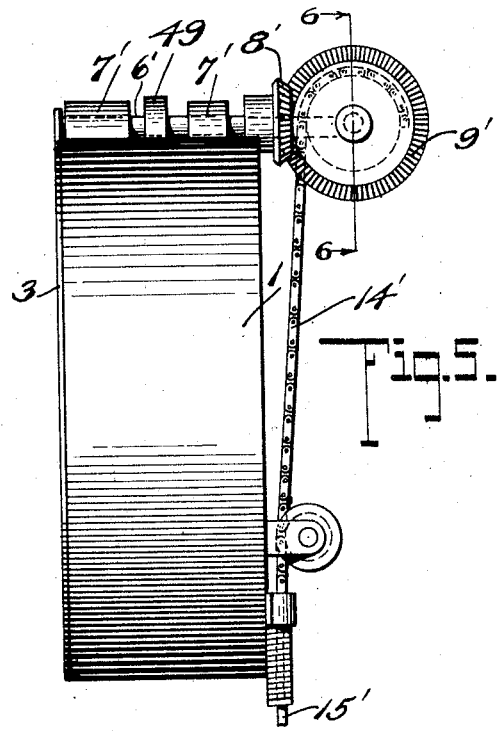
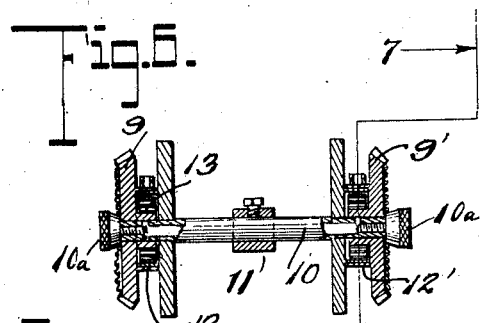
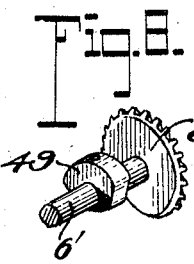
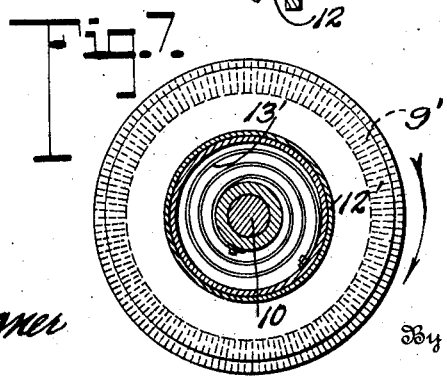
Inventor
J. G. Frieman
By Robb & Robb
Attorneys
Witness
G. H. Wagner

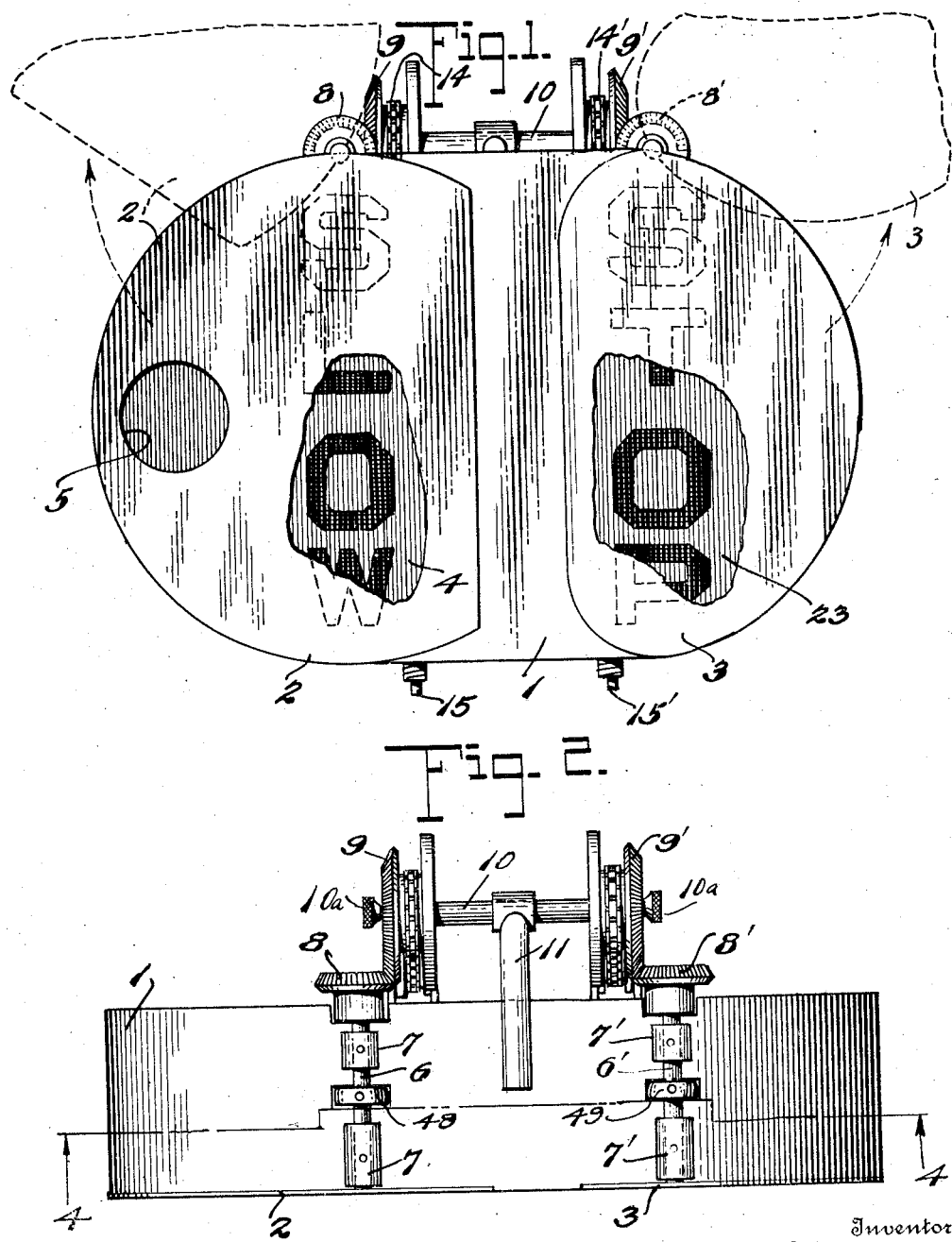

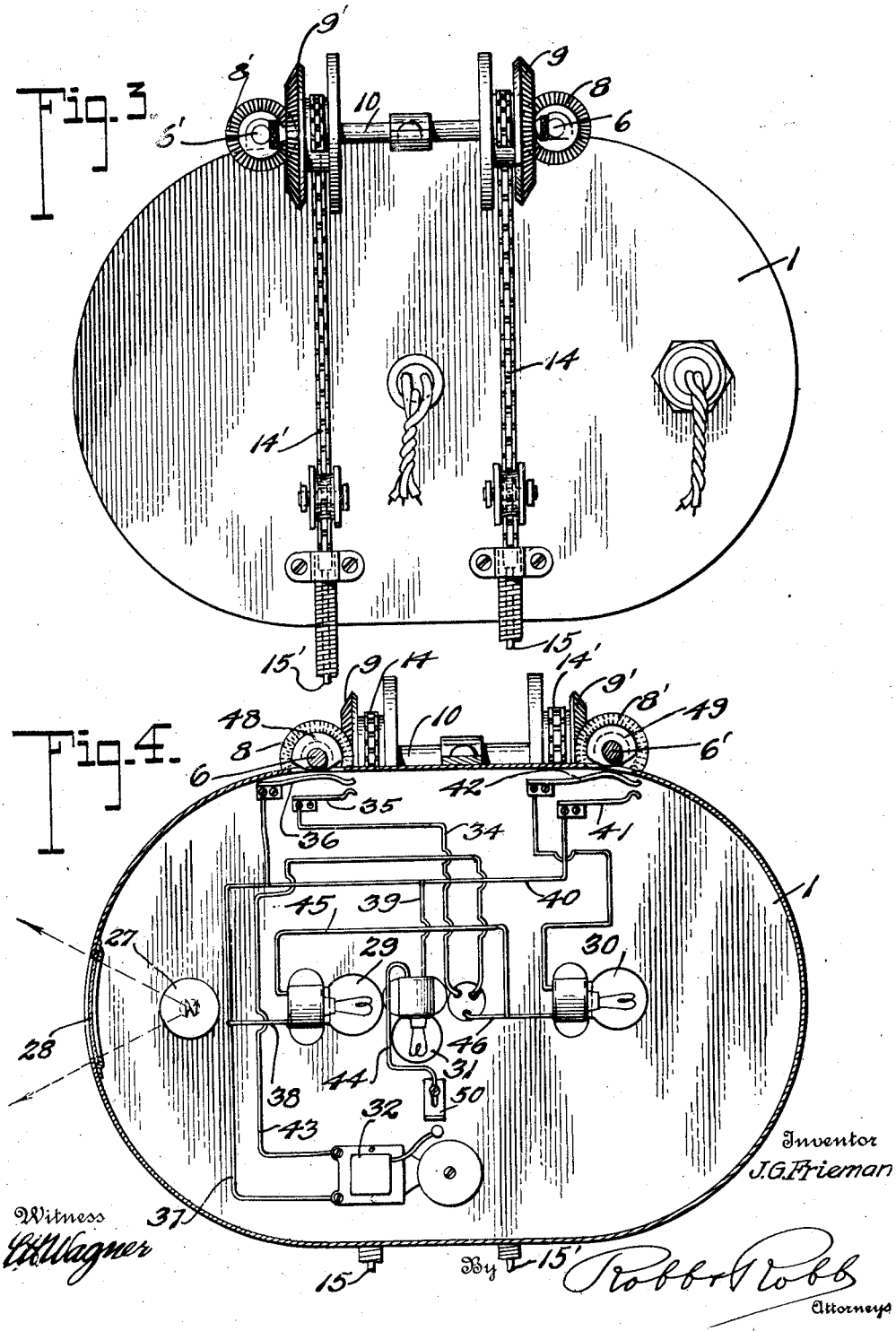

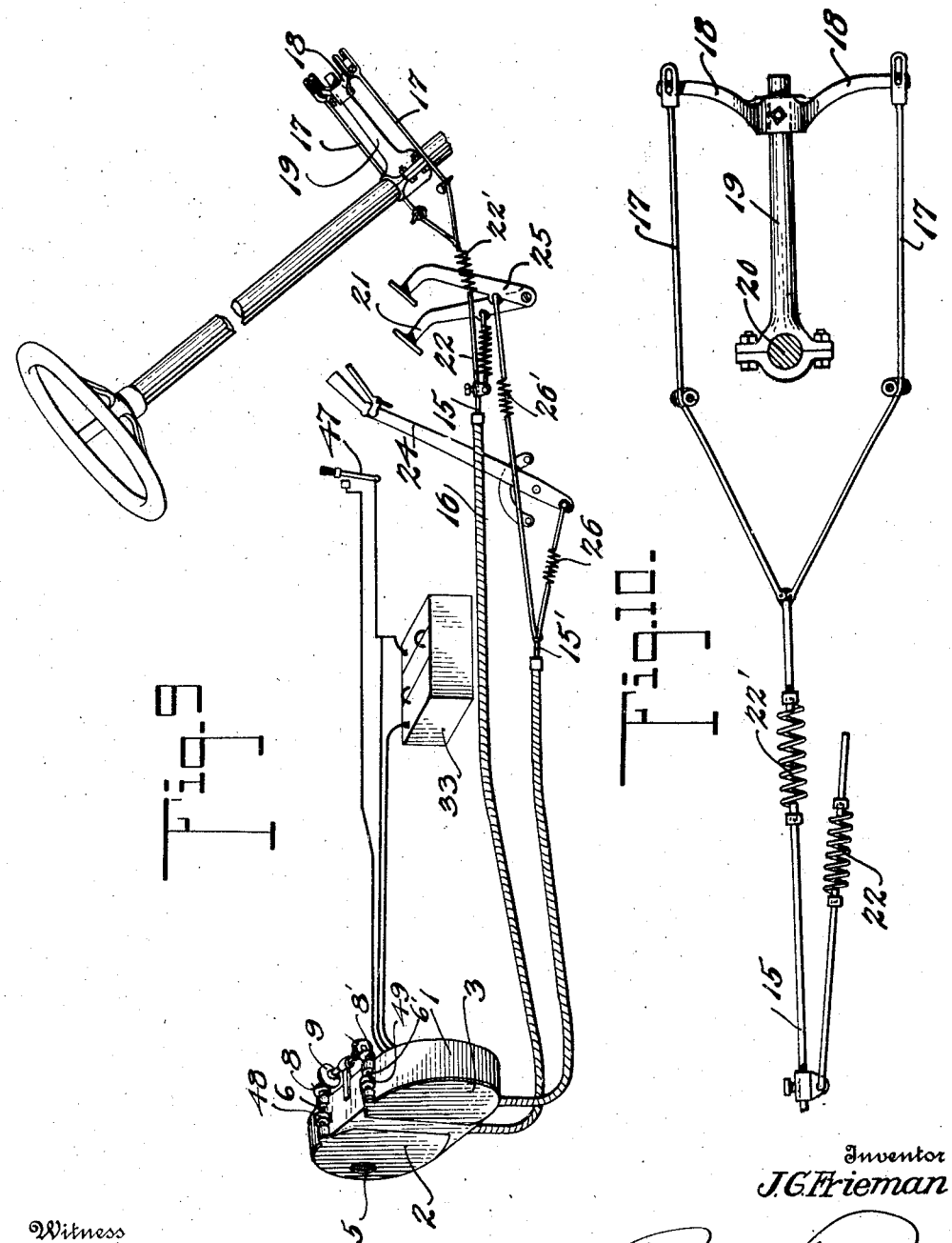

UNITED STATES PATENT OFFICE.

JACOB G. FRIEMAN, OF CHICAGO, ILLINOIS.

VEHICLE-SIGNAL.

1,363,863.

Specification of Letters Patent.

Patented Dec. 28, 1920.

Application filed February 25, 1919. Serial No. 279,123.

*To all whom it may concern:*

Be it known that I, JACOB G. FRIEMAN, a citizen of the United States, residing at Chicago, in the county of Cook and State of Illinois, have invented certain new and useful Improvements in Vehicle-Signals, of which the following is a specification.

The present invention relates to improvements in vehicle signals, by means of which the driver may apprise other vehicular traffic approaching his rear as to intended movements requiring caution on the part of the approaching vehicles.

While signals of one character or another have been heretofore proposed for this same purpose, it has been my especial aim to so arrange the signal instrumentalities that their operation will take place automatically in harmony with the operation of the devices controlling the movements of the vehicle so that the driver is not required to divert his attention from the proper control of his own machine to warn traffic. To this end, the invention comprises the combination with the steering, clutch and brake instrumentalities, of signal means operated by these independently or conjointly as they are employed to control the vehicle, and to the further end that the character of the signal displayed may be in accord with the nature of the control which a following vehicle should exercise.

A further object in view is to provide a device which will impart both an audible and visible indication to insure attracting attention to the signal displayed.

Subsidiary to these, I have in view the provision of a simple mechanical and electrical arrangement that may be economically manufactured, requiring no motor driving element, and utilizing a minimum amount of electrical power which may readily be obtainable from the usual battery equipment without serious drain thereon.

These and such other objects as may hereinafter appear are attained by the novel construction, combination and arrangement of parts to be hereinafter specifically described and claimed. Reference will now be had to the accompanying drawings forming a part of this specification, wherein:

Figure 1 is a front elevation of the signal portion of my invention;

Fig. 2 is a top plan view thereof;

Fig. 3 is a rear elevation of the same;

Fig. 4 is a transverse sectional view taken on the line 4—4 of Fig. 2;

Fig. 5 is an end elevation;

Fig. 6 is a sectional view taken on the line 6—6 of Fig. 5;

Fig. 7 is a sectional view taken on the line 7—7 of Fig. 6;

Fig. 8 is a fragmentary perspective view of an operating shaft showing more clearly the circuit closing cam thereof;

Fig. 9 is a perspective view showing somewhat diagrammatically the complete signal apparatus and its operative connections with the control instrumentalities of the vehicle; and Fig. 10 is an enlarged fragmentary view of the connections for the steering shaft of the vehicle.

Throughout the following detail description and on the several figures of the drawings, similar parts are referred to by like reference characters.

Taking up first the mechanical features of this invention, 1 designates a casing designed to be suitably attached to the rear of a motor vehicle, and having a cover member at either side, indicated 2 and 3, respectively. Beneath the cover 2 is a closure 4, for which I prefer to utilize glass colored red, for example, so as to disclose a red light through the window 5, normally constituting the tail light for the machine, the said closure bearing a letter sign or display of the word " Slow " which is observable when the cover plate 2 is moved from over the glass by means hereinafter described.

This cover referred to is fixed to an operating shaft 6, mounted in suitable bearings 7 upon the top of the casing 1, the shaft being provided with a gear 8 meshing with the gear 9 which is loosely mounted upon the hollow shaft 10, in turn supported by the overhanging arm 11 attached to said casing.

It will be observed, perhaps most clearly in Figs. 2 and 6, that the gear 9 is provided with a case 12 at one side within which is a spring 13, a chain 14 passing about said case downwardly at the rear of the casing 1 to a cable 15. This cable is preferably arranged in a flexible casing 16 and connects with the connections 17, 17 and they in turn have connections with the opposing arms 18 adjustably secured upon the forwardly projecting arm 19 clamped to the steering shaft 20 at a point which will preferably lie beneath the hood of the motor vehicle. (See Figs. 9 and 10.) In addition, the cable 15 is connected to the clutch pedal 21 of the vehicle, a spring 22, 22' being interposed in each of these connections aforesaid to permit of a certain amount of latitude of movement of the steering instrumentalities without effecting a movement of the cable. The arms 18, obviously, are adjustable on the arm 19 to permit of a proper amount of slack in the connections 17, or to overcome loss of tension of the springs.

Reverting now to the cover plate 3, which normally covers the glass 23 similar to the glass 4 and embodying a sign "Stop," this also is fixed to an operating shaft 6' journaled in the bearings 7' and having thereon the gear 8' meshing with the gear 9' on the other end of the shaft 10. The gear 9' with its case 12' is connected by the chain 14' and a cable 15' first to the emergency brake lever 24 and then to the service brake pedal 25, with interposed yieldable springs 26, 26'.

With reference to the mechanical operation, and with the description thus far given in view, it will be observed that when the steering shaft is turned in either direction, or when the operator declutches, the left hand cover plate 2 is rotated into the dotted line position shown in Fig. 1, thus displaying the sign "Slow," the return to normal covering position being assisted by the spring 13 which is wound up or tensioned by the uncovering movement just referred to. The desirability of such signaling as an incident to the foregoing operations will at once be apparent for it is well known that when turning, the operator of a vehicle usually slackens his speed considerably, at the same time throwing out his clutch, but whether or not he does the latter the signal is displayed by the steering operation. Likewise, preliminary to coming to a complete stop the clutch is thrown out and the sign "Slow" appears for the guidance of the traffic in the rear. In addition to these preliminary signals the operator automatically gives a further one incident to the application of the service or emergency brake members, which instrumentalities shift the cover plate 3 to uncover the sign "Stop."

Such a signal apparatus as described would have little utility at night unless provided with illuminating means, and this brings us to the electrical features of my invention. Referring now more especially to Fig. 4, it will be observed that at one side within the casing 1 is located a tail light 27, the light from which normally shows through the window 5 of the cover 2, as hereinbefore premised. Adjacent to the light is an end window 28 for the purpose of illuminating the license tag preferably disposed within range of this light.

At each side of the casing there is also provided other lights, one designated 29 and the other 30 and these afford illuminating means for the respective signs "Slow" and "Stop." In addition to these lights I provide a flash light 31 which works in conjunction with the audible signal bell 32. The electric current for these signal lights and bell may be obtained from any suitable source such for instance as the customary battery 33. A wire or conductor 34 from this battery passes into the casing 1 and leads to the terminal 35, supplying current through the contact 36 when closed, through wire 37 to the bell 32, through wire 38 to the light 29, through 39 to the light 31, and from thence by wire 40 to the terminal 41. When the contact 42 is closed the light 30 receives current. The return circuits for these various lights may be traced through wires 43, 44, 45 and 46 to battery. In order to cut out the sign lights 29 and 30 during the day, I employ a switch 47 arranged at a convenient point for access by the operator.

To produce the operation of these illuminating elements in conjunction with the cover plates 2 and 3, each of the shafts 6, 6' is provided with a cam 48, 49, preferably of non-conducting material, which when the shafts are rotated in the actuation of the clutch or brake or steering instrumentalities close the respective contacts 36 and 42. Thus when the clutch for example is disengaged, as when turning the vehicle, the bell 32 is sounded. I utilize a bell having preferably a slow moving armature and arrange proximate the tapper for said bell an adjustable terminal 50 through which the electric current is passed in each contact of the tapper therewith to the light 31, thereby producing an intermittent flash so that when the signs are displayed at one or both sides of the casing, attention is called thereto by both an audible and visible signal. The signaling operation just referred to takes place either during the day or night by virtue of the arrangement of the circuits, providing, of course, at night time the operator closes the switch 47 so as to maintain illumination of the sign lights 29 and 30 to produce a continued illumination of the signs "Slow" and "Stop" irrespective of the flash signal above mentioned, during the period of exposure of the signs.

It should, of course, be understood that the driver of the vehicle may at any time merely apply the service or emergency brake, in which event the contact 42 only is closed, but illumination of the sign "Stop"

does not take place unless accompanied by throwing out of the clutch, owing to the open circuit maintained by the separated contacts 35, 36 which must be closed before the illuminating circuits are complete.

It may be added, that as a part of the detail construction of the apparatus, I prefer to make the shaft 10 hollow so as to receive a lubricant which may be introduced thereinto by the displacement of either of the thumb screws 10ª, which not only constitute closures for the entrances to the shaft but are arranged to hold the gears 9 and 9' upon said shaft. In this manner the lubricant is fed through suitable openings to the gears to facilitate operation of the device.

The various advantages to be derived by a signal apparatus of this type need not be specified because of their obvious character, but it may be mentioned that the important feature of such signaling means, is the elimination of the human element so far as it devolves upon the operator of a vehicle to warn traffic approaching from the rear of intended movements on his part, is concerned.

Having thus described my invention, what I claim as new is:

1. In a signal device of the class described for motor vehicles the combination with steering and clutch instrumentalities, of a plurality of signal indicating means adapted to convey distinct intelligence and normally concealed from view, means concealing each of said signaling means, and mechanically operative connections between and common to said instrumentalities and the concealing means operable upon actuating either the clutch or steering instrumentalities to shift the appropriate concealing means through such common connections to expose its signal.

2. In a signal device of the class described for motor vehicles, the combination of a signal for indicating the contemplated movement of the vehicle, means normally concealing said signal, means for uncovering said signal upon operation of the control instrumentalities for the vehicle, an audible signal member operable by and when the means for uncovering the signal aforesaid is effective, including an oscillating part, and a visible signal device intermittently operative by the oscillating part aforesaid when the latter is operating.

3. In a signal device of the class described, the combination of a casing including a signal or sign, a cover member normally concealing said signal, a shaft journaled upon the casing to which the cover member is fixed, a gear secured to said shaft, an actuating gear meshing therewith, a cable connected to said last gear, and lever means for effecting uncovering operation of the cover member through the instrumentalities of the cable aforesaid.

4. In a signal apparatus of the class described, the combination of a casing including a signal or sign, a laterally shiftable cover member normally concealing said signal, means for actuating said cover member to expose the signal, and means for attracting attention to the signal comprising a continuous illuminating means and intermittently operating visible and audible signal devices simultaneously operable by the cover actuating means aforesaid.

5. In a signal apparatus of the class described, the combination of a casing including a signal or sign, a cover member normally concealing said signal, means for actuating said cover member to expose the signal, and means for attracting attention to the signal when exposed comprising a bell and flash light intermittently operable simultaneously with the uncovering of the signal by the actuating means aforesaid and as an incident to the operation of the bell.

6. In signal apparatus of the class described, the combination with a vehicle steering member, a clutch member and a brake member, of a casing having side by side cover members adapted to be actuated to display the signals in said casing, a flexible rod connection between one of said covers and the steering and clutch member whereby on operation of either of such elements said cover member is actuated to display the sign or signal, and a flexible connection intermediate the other cover member and the brake element whereby upon actuation of the latter the second mentioned sign or signal is displayed.

In testimony whereof I affix my signature.

JACOB G. FRIEMAN.